United States Patent
Knape

Patent Number: 5,428,977
Date of Patent: Jul. 4, 1995

[54] ARRANGEMENT FOR LOCKING THE IGNITION KEY OF A MOTOR VEHICLE BY THE SELECTOR LEVER OF AN AUTOMATIC TRANSMISSION

[75] Inventor: Dieter Knape, Heilbronn, Germany

[73] Assignee: Dr. Ing. h.c.F. Porsche AG, Weissach, Germany

[21] Appl. No.: 96,985

[22] Filed: Jul. 27, 1993

[30] Foreign Application Priority Data

Jul. 30, 1992 [DE] Germany .................. 42 25 182.6

[51] Int. Cl.6 ............................................ B60R 25/06
[52] U.S. Cl. ............................................ 70/247; 70/252
[58] Field of Search ............ 70/247, 248, 245, 254, 70/252; 477/99

[56] References Cited

U.S. PATENT DOCUMENTS

| | | | |
|---|---|---|---|
| 4,474,085 | 10/1984 | DeVogelaere et al. | 70/248 X |
| 4,854,193 | 8/1989 | Newman et al. | 70/248 |
| 4,887,702 | 12/1989 | Ratke et al. | 70/248 |
| 4,926,688 | 5/1990 | Murasaki | 477/99 |
| 4,967,883 | 11/1990 | Kito et al. | 70/252 X |
| 5,085,096 | 2/1992 | Behrens | 74/475 |
| 5,127,245 | 7/1992 | Imai et al. | 70/252 X |
| 5,129,494 | 7/1992 | Rolinski et al. | 70/248 X |
| 5,150,593 | 9/1992 | Kobayashi et al. | 70/248 |
| 5,207,124 | 5/1993 | Anderson et al. | 477/99 |

FOREIGN PATENT DOCUMENTS

| | | |
|---|---|---|
| 0334672A1 | 9/1989 | European Pat. Off. |
| 3911570C1 | 6/1990 | Germany |
| 3943011A1 | 6/1990 | Germany |

*Primary Examiner*—Peter M. Cuomo
*Assistant Examiner*—Monica E. Millner
*Attorney, Agent, or Firm*—Evenson McKeown Edwards & Lenahan

[57] ABSTRACT

An arrangement for locking the ignition key of a motor vehicle by the selector lever of an automatic transmission has a bowden cable fastened to the ignition key. This bowden cable is pivotally connected to a check lever disposed in a pivotal connection parallel to the swivel shaft of the selector lever. The check lever actuates a swivel lever disposed on the swivel shaft in such a manner that during the drive a withdrawing of the ignition key is prevented and in the P-position of the selector lever, the arrangement is secured against theft.

9 Claims, 4 Drawing Sheets

ARRANGEMENT FOR LOCKING THE IGNITION KEY OF A MOTOR VEHICLE BY THE SELECTOR LEVER OF AN AUTOMATIC TRANSMISSION

BACKGROUND AND SUMMARY OF THE INVENTION

The present invention relates to an arrangement for locking the ignition key of a motor vehicle via a swivellable selector lever of an automatic transmission of a motor vehicle, the selector lever being lockable in selector lever selecting positions P, R, N, D, 3, 2, 1 by a spring-loaded pressure rod longitudinally guided in the selector lever, and being releasable from the locking by a pressing-down of the pressure rod.

A locking arrangement of this type is shown in German Patent Document DE 39 11 570 C1. A sensor signal for the position of the ignition key is entered into a logic element which controls a lifting magnet. The lifting magnet adjusts a catch into whose indentations a locking member of the selector lever engages. In a known manner, the swivellable selector lever can be mechanically locked in positions P=parking, R=reverse gear, N=neutral position, D=drive (driving), 2=2nd gear, 1=1st gear. By means of such a locking, it is to be achieved that the ignition key cannot be withdrawn during the drive but only in the P position, and also that in the P position a swivelling of the selector lever and thus a preselecting of transmission gears is impossible.

It is an object of the invention to provide a purely mechanically operating, simple ignition key locking system.

This and other objects are achieved by the present invention which provides an arrangement for locking the ignition key of a motor vehicle via a swivellable selector lever of an automatic transmission of a motor vehicle, the selector lever being lockable in selector lever selecting positions P, R, N, D, 3, 2, 1 by a spring-loaded pressure rod longitudinally guided in the selector lever, and being releasable from the locking by a pressing-down of the pressure rod. The arrangement comprises a swivel lever rotatably disposed on a swivel shaft of the selector lever, a bowden cable operatively coupled to the ignition key, and a check lever pivotally connected with the bowden cable and engageable with the swivel lever. The pivotal connection of the check lever is parallel to the swivel shaft of the selector lever. The check lever is responsive to turning of the ignition key to swivel the swivel lever such that in the selecting position P of the selector lever, the swivel lever prevents the pressing-down of the pressure rod.

When a bowden cable is fastened to an ignition key which is pivotally connected in a check lever disposed in parallel to the swivel axis of the selector lever, and via it, a swivel lever swivels under a pressure rod of the selector lever, a locking of the selector lever can be achieved on a purely mechanical basis by means of the ignition key.

Other objects, advantages and novel features of the present invention will become apparent from the following detailed description of the invention when considered in conjunction with the accompanying drawings.

DETAILED DESCRIPTION OF THE DRAWINGS

Figure 1:
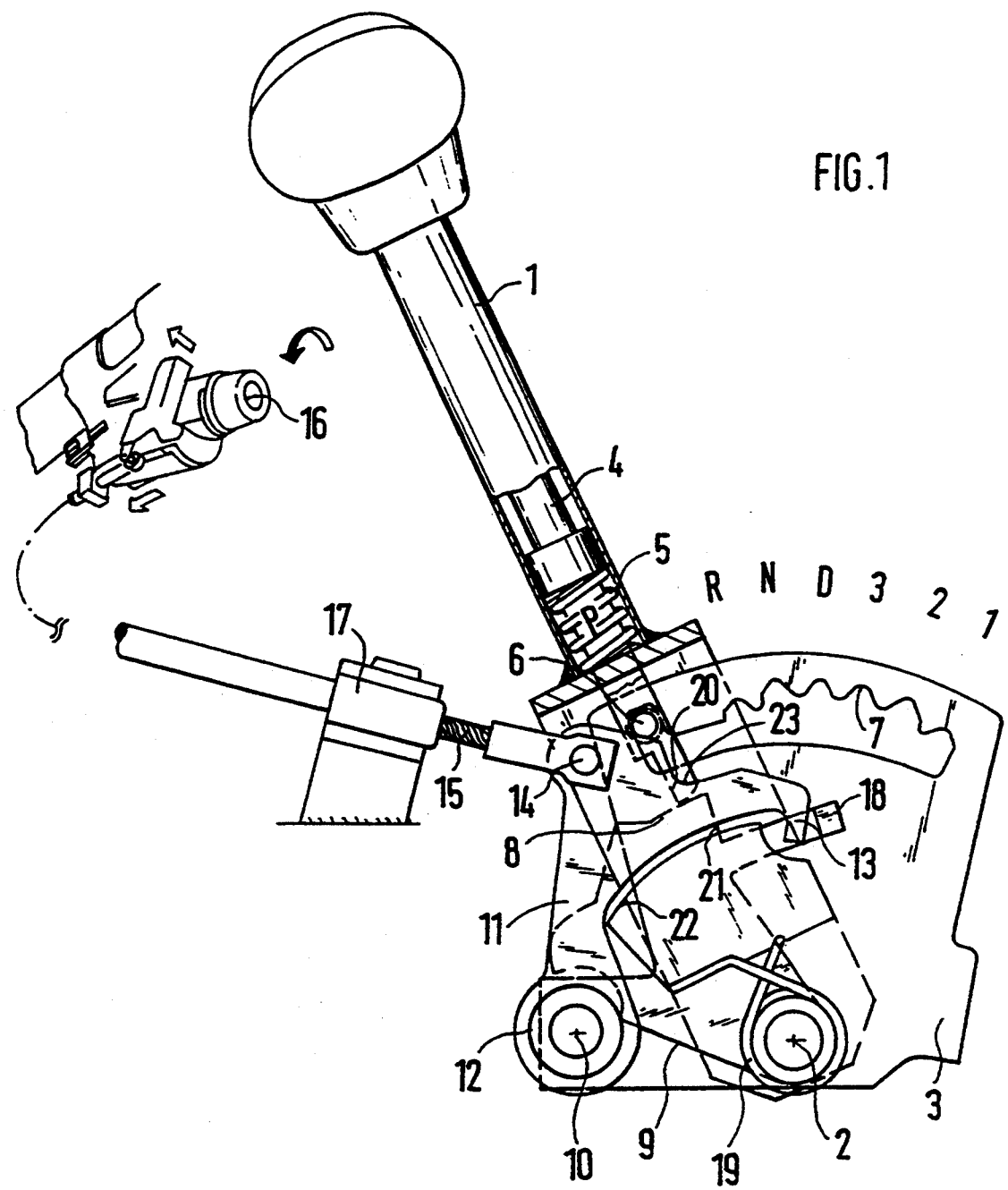
FIG. 1 is a view of a locking system according to the present invention when the ignition key is withdrawn, in position P.

As seen in FIG. 1, a selector lever 1 of an automatic transmission is rotatably disposed on a swivel shaft 2 of a shift control housing 3 fixed to the vehicle body. A pressure rod 4 is longitudinally guided centrically in the selector lever 1 and is braced upward by a spring 5. In the illustrated embodiment, a transverse pin 6 fastened on the bottom of the selector lever 1 engages in a P-detent of a detent profile 7 constructed on the shift control housing for the locking of the swivel positions P, R, N, D, 3, 2, 1. A moving out from the P-position and a swivelling of the selector lever 1 by a manual pressing-down of the pressure rod 4 is not possible because the pressure rod 4 rests on its bottom side on the cam contour 8 of a swivel lever 9 which is rotatably disposed on the swivel shaft 2.

Laterally to the swivel lever 9, a check lever 11 is disposed in a shaft 10 that is parallel to the swivel lever 2. This check shaft 11 is constructed as a rectangular angle lever. Its bearing point 12 is disposed on one leg; a nose 13 for carrying out locking functions is mounted on the other leg. On its center corner point, the pivotal connecting point 14 of a bowden cable 15 is situated which is connected with the rotatable ignition key 16 and can be moved back and forth by the rotating of this ignition key. In the illustrated position, the ignition key 16 is withdrawn; the bowden cable 15 is in the position in which it is moved the farthest from the bowden cable guide 17. In this moving-out position, the bowden cable 17 swivels the check lever 11 toward the right. By resting against the angle stop 18 of the swivel lever 9, the nose 13 of the check lever 11 presses the swivel lever 9 to the right until the cam contour 8 has moved under the pressure rod 4. Thus, a pressing-down of the pressure rod 4 and thus an engaging of the transmission gears becomes impossible. Since in this position no transmission gear can be selected, a purely mechanically acting anti-theft safety device is implemented.

Figure 2:
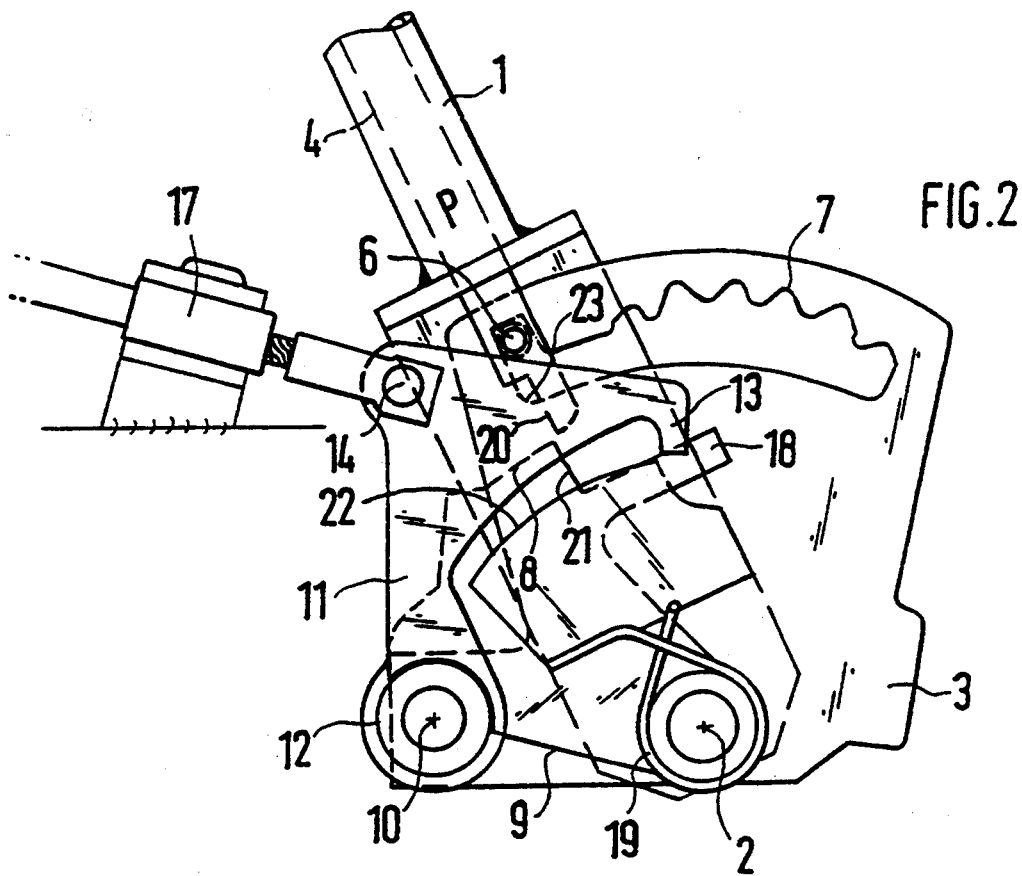
FIG. 2 is a view of the locking system when the transmission is ready for driving.
Figure 3:
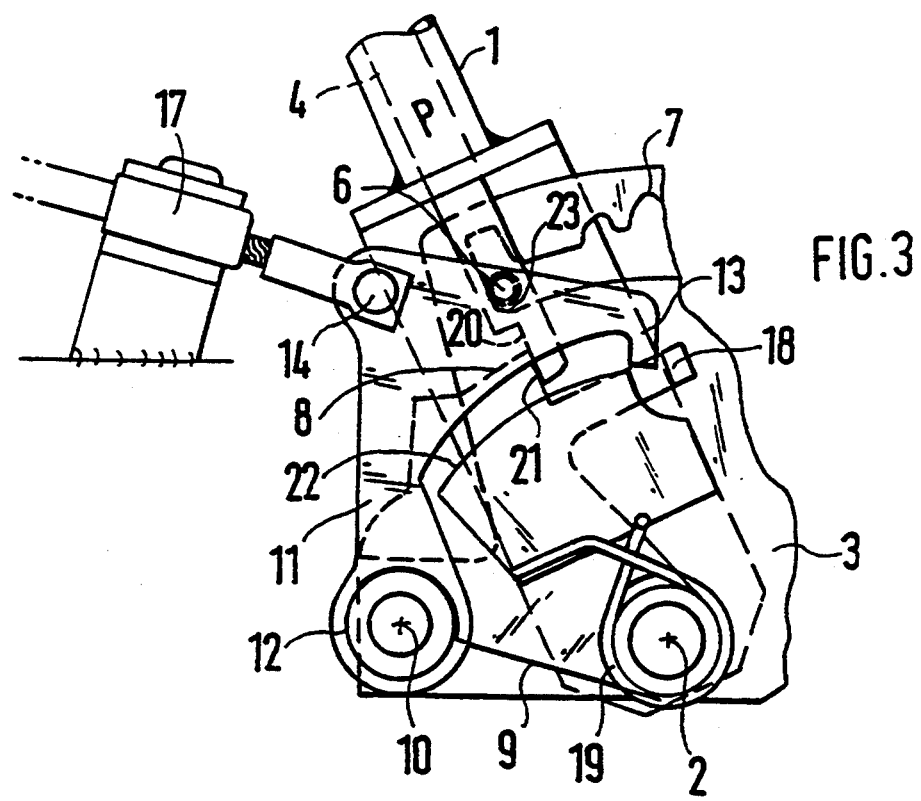
FIG. 3 is a view of the locking system when the selector lever is disengaged.
Figure 4:
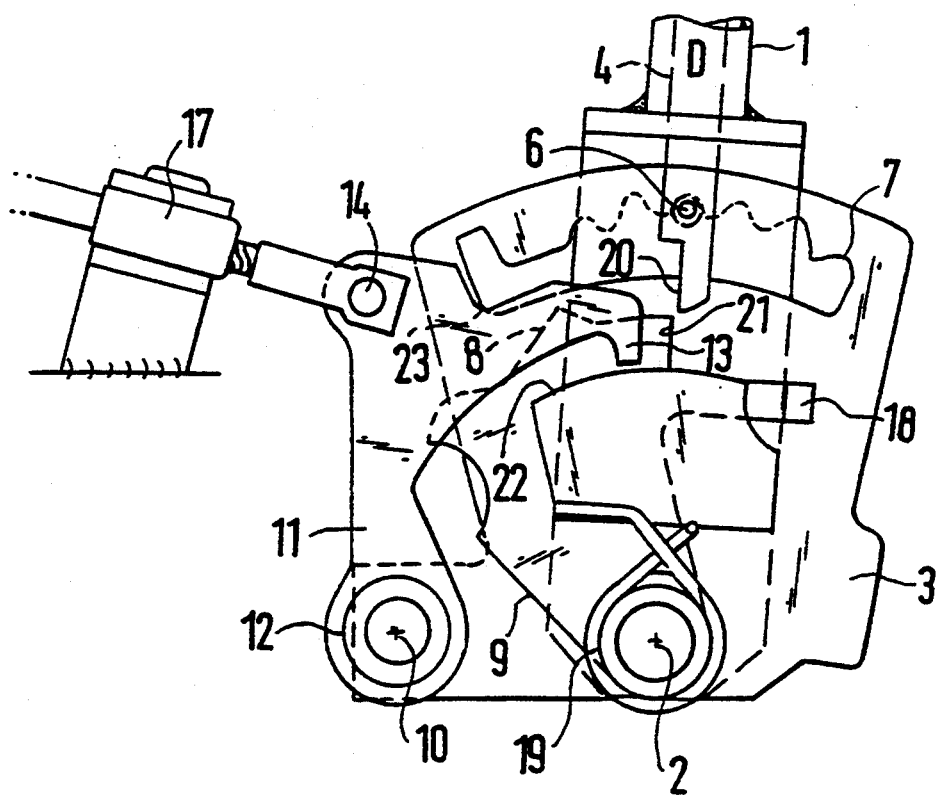
FIG. 4 is a view of the locking system during the drive, in position D.

An unlocking out of the P-detent becomes possible only in the swivel position of the swivel lever 9 according to FIG. 2 and FIG. 3. By inserting and turning the ignition key in the ignition starting switch, the pivotal connecting point 14 is pulled in the direction of the bowden cable guide 17. In this case, the check lever 11 is swivelled toward the left until the pressure rod 4 can slide with its opposite surface 20 along the shoulder 21 of the swivel lever 9 and thus the selecting positions R, N, D, 3, 2, 1 can be carried out. In this case, the nose 13 constructed on the free end of the check lever 11 slides on the circular segment 22 fixedly mounted on the selector lever 1. The swivelling of the swivel lever 9 relative to the selector lever 1 as well as the turning and withdrawal of the ignition key 16 is therefore not possible in the case of these selecting positions.

Figure 5:
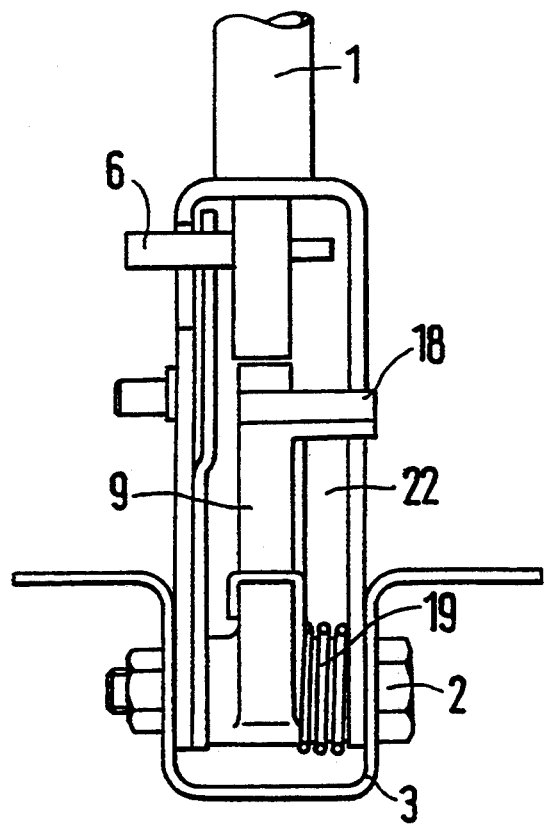
FIG. 5 is a sectional view according to Line V—V of FIG. 4.
Figure 6:
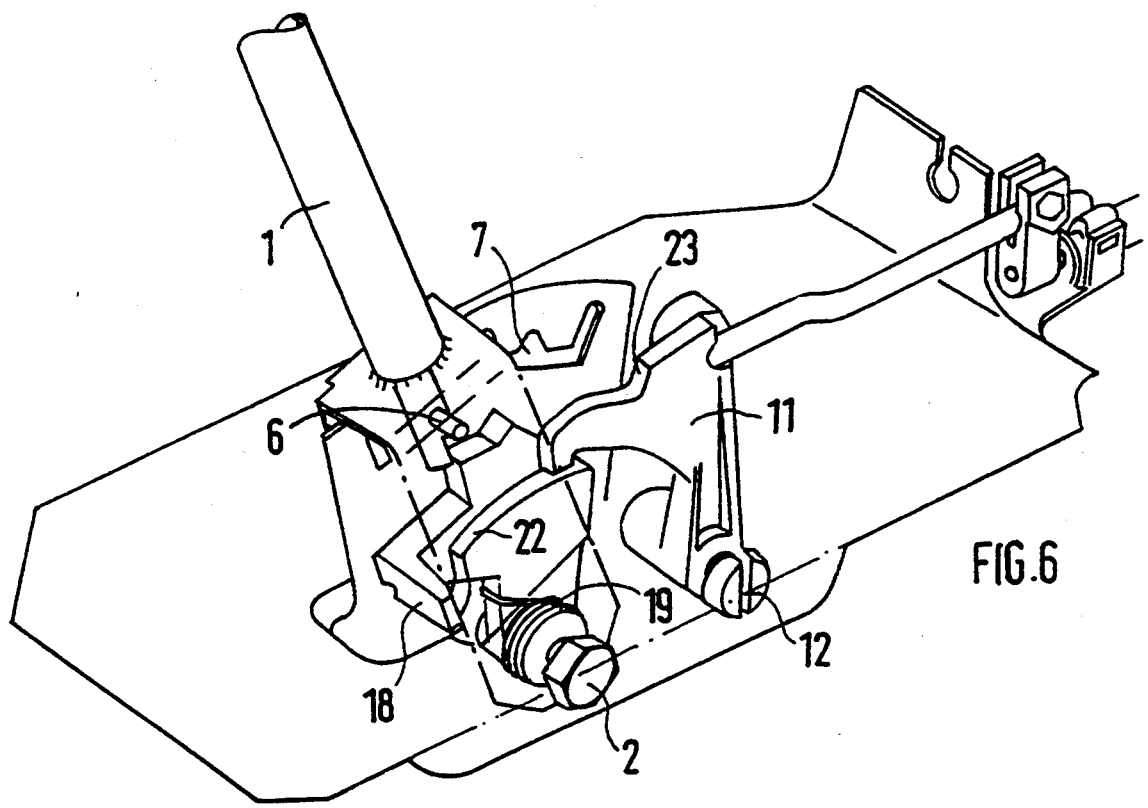
FIG. 6 is a perspective representation of the locking system.
Figure 7:
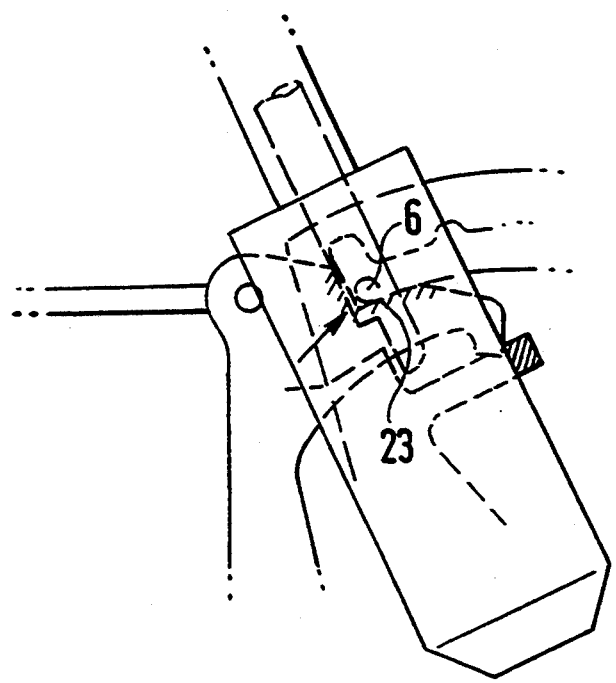
FIG. 7 is a view of a device constructed in accordance with an embodiment of the present invention that protects against misuse.

As illustrated more clearly in FIG. 5, the swivel lever 9, which is provided with an angle stop 18, is held by a torsion spring 19 in contact on the longitudinal side of the selector lever 1 constructed at this point as a U-profile.

In order to exclude the locking system from being rendered inoperative by the simultaneous actuating of the ignition key 16 and of the selector lever pressure rod 4, a misuse safety device is provided. The transverse pin 6 is dimensioned to be so long that its one end can form-lockingly engage in the selector lever detents and its other end can form-lockingly engage in a detent groove 23 on the top side of the check lever 11.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for locking the ignition key of a motor vehicle via a swivellable selector lever of an automatic transmission of a motor vehicle, the selector lever being lockable in selector lever selecting positions by a spring-loaded pressure rod longitudinally guided in the selector lever, and being releasable from the locking by a pressing-down of the pressure rod, comprising:
   a swivel lever rotatably disposed on a swivel shaft of the selector lever;
   a bowden cable operatively coupled to the ignition key; and
   a check lever pivotally connected with the bowden cable and engageable with the swivel lever, the pivotal connection of the check lever being parallel to the swivel shaft of the selector lever, the check lever responsive to turning of the ignition key to swivel the swivel lever such that in a selecting position P of the selector lever, the swivel lever prevents the pressing-down of the pressure rod.

2. An arrangement according to claim 1, further comprising a circular segment fastened to the selector lever and wherein the check lever has a free end, and wherein when the selecting lever selecting positions are passed through by the selector lever, the free end of the check lever rests on the circular segment to thereby prevent turning of the ignition key.

3. An arrangement according to claim 1, wherein the check lever is a rectangular angle lever and has a first leg and a second leg, with a pivot bearing point on the first leg, with the second leg having the free end and a nose on the free end for carrying out locking operations, the check lever also having a center corner point that operates as a linking point of the bowden cable.

4. An arrangement according to claim 1, wherein the swivel lever includes a lateral angle stop, and further comprising a torsion spring coupled to the selector lever, wherein the swivel lever is held in contact on the longitudinal side of the selector lever by the torsion spring.

5. An arrangement according to claim 1, wherein the pressure rod has an opposite surface and the swivel lever has a top side with a rectangular shoulder, the pressure rod when pressed down resting with the opposite surface against the rectangular shoulder.

6. An arrangement according to claim 1, wherein the check lever includes a detent groove, and further comprising a detent profile and a transverse pin fastened in the pressure rod, the transverse pin having a first end engageable into the detent profile to fix the selecting positions and a second end that engages form-lockingly in the detent groove of the check lever when the pressure rod is pressed down.

7. An arrangement according to claim 2, wherein the swivel lever includes a lateral angle stop, and further comprising a torsion spring coupled to the selector lever, wherein the swivel lever is held in contact on the longitudinal side of the selector lever by the torsion spring.

8. An arrangement according to claim 7, wherein the pressure rod has an opposite surface and the swivel lever has a top side with a rectangular shoulder, the pressure rod when pressed down resting with the opposite surface against the rectangular shoulder.

9. An arrangement according to claim 1, further comprising a shift control housing surrounding the swivel lever and the check lever.

* * * * *